(12) United States Patent
Medioni et al.

(10) Patent No.: US 7,953,675 B2
(45) Date of Patent: May 31, 2011

(54) TENSOR VOTING IN N DIMENSIONAL SPACES

(75) Inventors: Gerard Medioni, Los Angeles, CA (US); Philippos Mordohai, Carrboro, NC (US)

(73) Assignee: University of Southern California

( * ) Notice: Subject to any disclaimer, the term of this patent is extended or adjusted under 35 U.S.C. 154(b) by 585 days.

(21) Appl. No.: 11/480,285

(22) Filed: Jun. 29, 2006

(65) Prior Publication Data
US 2010/0250475 A1 Sep. 30, 2010

Related U.S. Application Data

(60) Provisional application No. 60/696,030, filed on Jul. 1, 2005.

(51) Int. Cl.
*G06F 15/18* (2006.01)
(52) U.S. Cl. ........................................................ 706/12
(58) Field of Classification Search .................. 706/12
See application file for complete search history.

(56) References Cited

U.S. PATENT DOCUMENTS

| | | | |
|---|---|---|---|
| 6,260,032 B1 | 7/2001 | Shizawa | |
| 2002/0024516 A1 | 2/2002 | Chen et al. | |
| 2004/0223630 A1 | 11/2004 | Waupotitsch et al. | |
| 2004/0223631 A1 | 11/2004 | Waupotitsch et al. | |
| 2005/0111705 A1 | 5/2005 | Waupotitsch et al. | |
| 2005/0226509 A1 | 10/2005 | Maurer et al. | |

OTHER PUBLICATIONS

Medioni ("Tensor Voting").*
Belkin et al ("Semi-Supervised Learning on Riemannian Manifolds").*
Tong et al ("First Order Augmentation to Tensor Voting for Boundary Inference and Multiscale Analysis in 3D" May 2004).*
Tong et al ("Simultaneous Two-View Epipolar Geometry Estimation and Motion Segmentation by 4D Tensor Voting" Feb. 2004).*
Arya, S., et al., "An Optimal Algorithm for Approximate Nearest Neighbor Searching in Fixed Dimensions", *Journal of the ACM*, 45(6):891-923 (1998).
Belkin, M., et al., "Laplacian Eigenmaps for Dimensionality Reduction and Data Representation", *Neural Computation*, 15(6):1373-1396 (2003).
Brand, M., "Charting a manifold", *Advances in Neural Information Processing Systems 15*, S. Thrun, S. Becker and K. Obermayer, Eds., MIT Press, Cambridge, MA, pp. 961-968 (2003).
Bruske, J., et al., "Intrinsic Dimensionality Estimation With Optimally Topology Preserving Maps", *IEEE Trans. on Pattern Analysis and Machine Intelligence*, 20(5):572-575, May 1998.
de Silva, V., et al., "Global versus local methods in nonlinear dimensionality reduction", *Advances in Neural Information Processing Systems 15*, S. Thrun, S. Becker and K. Obermayer, Eds., MIT Press, Cambridge, MA, pp. 705-712 (2003).
Donoho, D., et al., "Hessian Eigenmaps: Locally Linear Embedding Techniques for High-Dimensional Data", *Proceedings of National Academy of Science*, 100(10):5591-5596 (2003).
He, X., et al., "Locality preserving projections (LPP)", *Advances in Neural Information Processing Systems 16*, S. Thrun, L. Saul, B. Schölkopf, Eds., MIT Press, Cambridge, MA, pp. 841-848 (2004).

(Continued)

*Primary Examiner* — Donald Sparks
*Assistant Examiner* — Lut Wong
(74) *Attorney, Agent, or Firm* — Fish & Richardson P.C.

(57) ABSTRACT

A tensor voting scheme which can be used in an arbitrary number N of dimensions, up to several hundreds. The voting scheme can operate on unorganized point inputs, which can be oriented or unoriented, and estimate the intrinsic dimensionality at each point. Moreover it can estimate the tangent and normal space of a manifold passing through each point based solely on local operations.

11 Claims, 2 Drawing Sheets

OTHER PUBLICATIONS

Jenkins, O. C., et al., "Deriving Action and Behavior Primitives from Human Motion Data", *Proc. IEEE/RSJ International Conference on Intelligence Robots and Systems*, Lausanne, Switzerland, Sep. 30-Oct. 4, 2002, pp. 2551-2556 (2002).

Medioni, G., et al., *A Computational Framework for Segmentation and Grouping*, Elsevier, New York, NY (2000).

Mordohai, P., et al., "Unsupervised Dimensionality Estimation and Manifold Learning in High-Dimensional Spaces by Tensor Voting", *submitted to Intern. Joint Conf. on Artificial Intelligence*, pp. 798-803 (2005).

Roweis, S.T., et al., "Nonlinear Dimensionality Reduction by Locally Linear Embedding", *Science*, vol. 290, pp. 2323-2326 (2000).

Saul, L.K., et al., "Think Globally, Fit Locally: Unsupervised Learning of Low Dimensional Manifolds", *Journal of Machine Learning Research*, vol. 4, pp. 119-155 (2003).

Schölkopf, B., et al., "Nonlinear Component Analysis as a Kernel Eigenvalue Problem", *Neural Computation*, 10(5):1299-1319 (1998).

Tang, C.K., et al., "N-Dimensional Tensor Voting and Application to Epipolar Geometry Estimation" *IEEE Trans. on Pattern Analysis and Machine Intelligence*, 23(8):829-844, Aug. 2001.

Teh, Y.W., et al., "Automatic Alignment of Local Representations", *Advances in Neural Information Processing Systems 15*, S. Thrun, S. Becker and K. Obermayer, Eds., MIT Press, Cambridge, MA, pp. 841-848 (2003).

Tenenbaum, J.B., et al., "A Global Geometric Framework for Nonlinear Dimensionality Reduction", *Science*, vol. 290, pp. 2319-2323 (2000).

Tong, W.S., et al., "First Order Augmentation to Tensor Voting for Boundary Inference and Multiscale Analysis in 3D", *IEEE Trans. on PAMI*, 26(5):594-611, May 2004.

Wang, J., et al., "Adaptive Manifold Learning", *Advances in Neural Information Processing Systems 17*, L.K. Saul, Y. Weiss, L. Bottou, Eds., MIT Press, Cambridge, MA, pp. 1473-1480 (2005).

Weinberger, K.Q., et al., "Unsupervised learning of image manifolds by semidefinite programming", in *Proc. Int. Conf. on Computer Vision and Pattern Recognition*, pp. II: 988-995 (2004).

Belkin, M., et al., "Semi-Supervised Learning on Riemannian Manifolds", *Machine Learning*, 56(1-3):1-33, Nov. 2003, [Retrieved from the internet Apr. 14, 2007], <URL:http://www.iipl.fudan.edu.cn/~zhangjp/literatures/MLF/manifold%20learning/paper2.pdf>.

Medioni, G., "Tensor Voting", 5 pages, Mar. 2002, [Retrieved from the internet Apr. 14, 2007], <URL:http://homepages.inf.ed.ac.uk/rbf/CVonline/LOCAL_COPIES/MORDOHAI/tensorvoting.html>.

Medioni, G., et al., "Tensor Voting: Theory and Applications", 10 pages, 2000, [Retrieved from the internet Apr. 14, 2007], <URL:http://www.wisdom.weizmann.ac.il/~boiman/reading/tensor_voting/tensor_voting.pdf>.

* cited by examiner

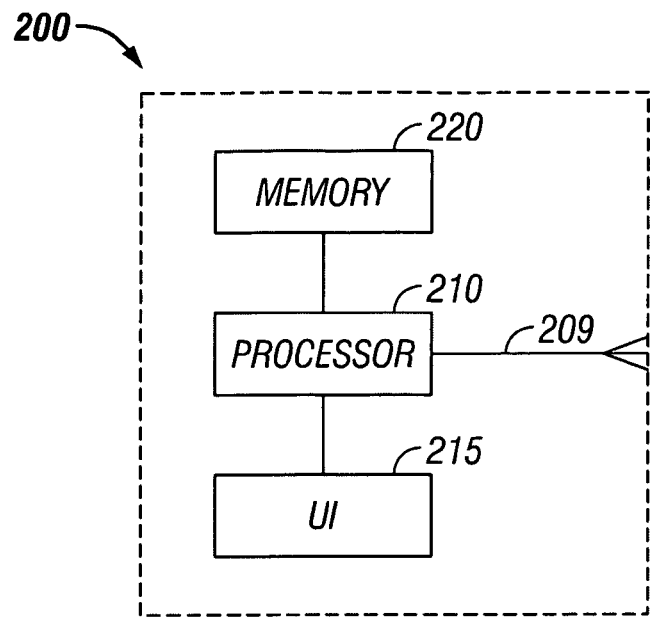
FIG. 2
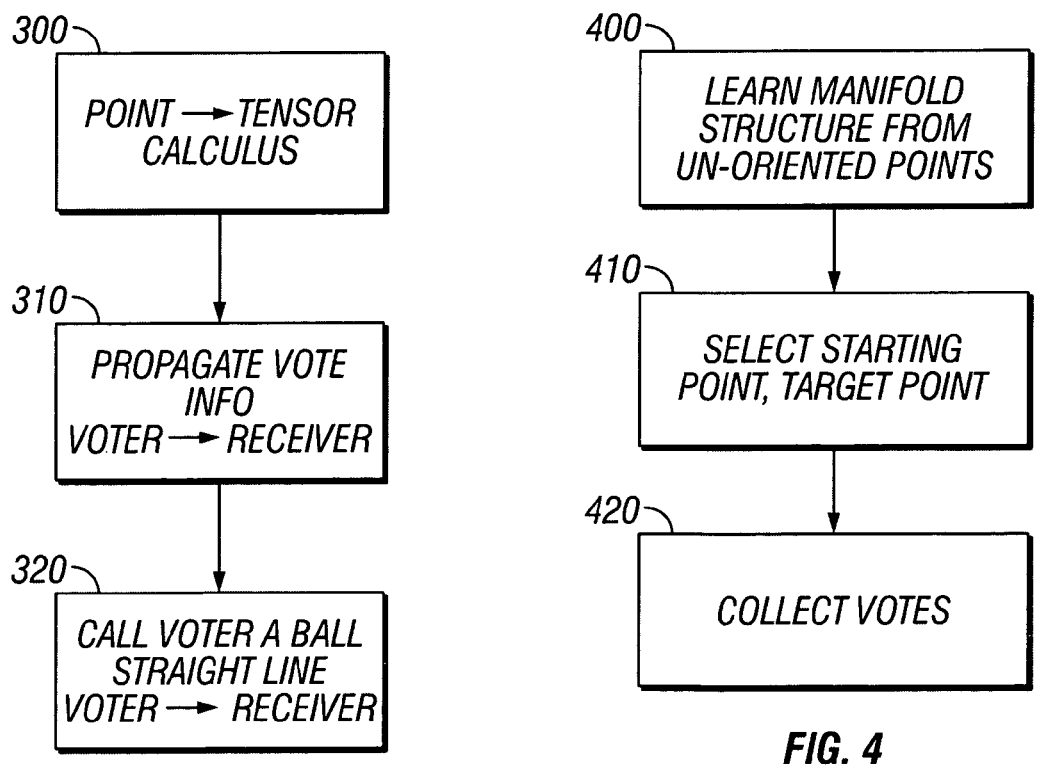
FIG. 3
FIG. 4

TENSOR VOTING IN N DIMENSIONAL SPACES

CROSS-REFERENCE TO RELATED APPLICATIONS

This application claims priority to U.S. Application Ser. No. 60/696,030, filed on Jul. 1, 2005. The disclosure of the prior application is considered part of (and is incorporated by reference in) the disclosure of this application.

FEDERALLY SPONSORED RESEARCH OR DEVELOPMENT

The U.S. Government may have certain rights in this invention pursuant to Grant Nos. IRI-9811883 and IIS 03 29247 awarded by NSF.

BACKGROUND

Tensor voting is a known technique of perceptually grouping unorganized and noisy data. However, the calculation of tensor voting schemes has typically been limited to special cases.

Many tensor voting schemes use precomputed voting fields as lookup tables from which votes are retrieved when necessary. While this system works well for many purposes, it requires large amounts of space for storing large amounts of voting fields, and any advantage of using pre-computed voting fields vanishes as the dimensionality increases. Applying this system to higher dimensionality becomes difficult. An application of the lookup table system to eight dimensions has been published, but further generalization to other dimensionality is unlikely.

Different forms of manifold learning techniques are known including those called locally linear embedding, Isomap, Laplacian Eigenmaps, Hessian LLE, semidefinite embedding, as well as other approaches.

SUMMARY

The present application defines a form of tensor voting that can be applied to data of very high dimensionality. An embodiment describes applying the tensor voting to data of N dimensions.

Embodiments are also described that are efficient in time and space complexity, and can be used more efficiently than the previous embodiments.

Embodiments describe a new technique for vote generation, and described operation in local neighborhoods without global computations. Another embodiment describes an unsupervised manifold learning which may be formed from unorganized points.

Another embodiment describes dimensionality estimation.

BRIEF DESCRIPTION OF THE DRAWINGS

FIG. 2 shows a block diagram of a computer system that operates in this way;

FIG. 3 shows a flowchart of a tensor voting embodiment; and

FIG. 4 illustrates a flowchart of manifold learning.

DETAILED DESCRIPTION

Figure 1A:
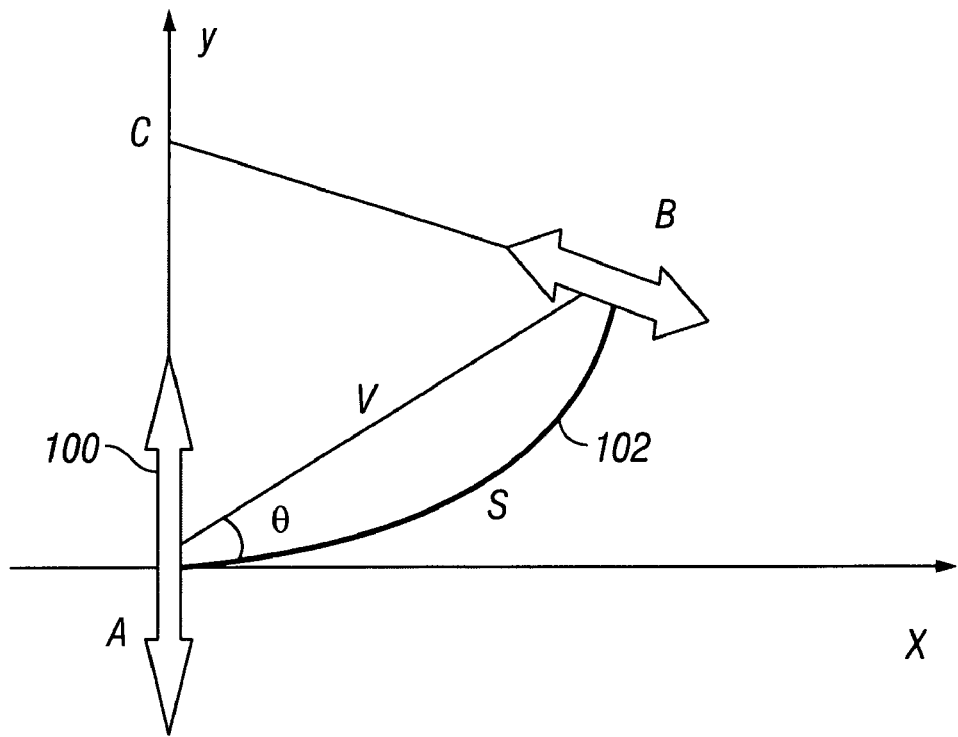
FIGS. 1A and 1B show respectively stick voting and ball voting.

An embodiment describes how to carry out Tensor voting in arbitrary numbers of dimensions, for example, between 4 and 500 dimensions. This allows many different kinds of applications. One important application is manifold learning, which can be used in pattern recognition, data mining, kinematics, non-linear interpolation and visualization, or in any other applications which attempt to find relations between points that cannot be visualized. Tensor voting may also be used in computer vision applications.

Tensor voting relies on a tensor calculus for its representation, and uses a non-linear voting scheme for its data communication. Points can be represented as tensors, which represent local aspects of the points. A local representation of a curve, a surface or any manifold in N dimensions is provided by its point coordinates, its associated tangents and normals. The orientation of a surface is defined in "tangent space", and in "normal space".

Often, it is not known in advance what type of entity the abstraction may belong to: it may be a point, curve or surface in 3D. Moreover, features may overlap, and the location therefore may actually correspond to multiple feature types at the same time. The features may be completely non-parametric.

A second order, symmetric, non-negative tensor is used to capture both the orientation information and its confidence for saliency. The tensor can be visualized as an ellipse in two dimensions, an ellipsoid in three dimensions or a hyper ellipsoid in higher dimensions. The shape of the tensor defines the type of information that has been captured, e.g. a point, a curve, or a surface element. The size of the tensor represents its saliency. The saliency refers to the perceived importance of the structures.

Once the tensors are defined, they communicate with each other, or "vote" in order to derive their preferred orientation. The voting fields are used to determine the orientation and magnitude. The result of the vote analysis effectively defines the most likely surface, or other orientation.

After the votes have been analyzed both according to the eigenvalues and eigenvectors of the tensors, structures are extracted. The locations with the highest saliency and voting scores are typically taken as being the correct structure.

In more detail, the system may operate to define a point or set of points according to its tensor properties. FIG. 2 illustrates a computer system 200 which may receive information indicative of the points and structures 209. A processor 210 communicates with a user interface 215 and a memory 220. The memory may store a computer program that when run by the processor, determines the values and operations set forth herein. The FIG. 2 computer runs a software program, for example, following the flowcharts described herein.

At 300, a point is represented according to its tensor calculus. The representation may be a second-order symmetric nonnegative definite tensor, and as described above may be considered as either a matrix or an ellipsoid. The tensor may represent the structure of a manifold that extends through the point. Normals of the manifold are encoded as eigenvectors corresponding to non-zero eigenvalues of the tensor. Tangents of the manifold are encoded as eigenvectors with zero eigenvalues.

A point in an N dimensional hyperplane has one normal and N-1 tangents. Therefore, this point is represented by a tensor with one nonzero eigenvalue associated with an eigenvalue that is parallel to the plane of the normal. The remaining n-1 eigenvalues are zero.

A point in a two-dimensional manifold in N dimensions has 2 tangents and N-2 normals. Thus, this is represented by a tensor with 2 zero eigenvalues associated with eigenvectors in the tangent space of the manifold.

More generally, the tensor at a point on the manifold of dimensionality d, with the vector $n_i$ spanning normal space, can be represented as $$T = \sum_{i=1}^{d} \vec{n}_i \vec{n}_i^T \qquad (1)$$

where $n_i n_i^T$ is the direct products of the eigenvectors that span the normal space of the manifold.

A point without orientation information can be equivalently viewed as having all possible normals and is encoded as the identity matrix. A tensor in this form represents an equal preference for orientations. This kind of tensor is shown in FIG. 1B, and labeled as a "ball tensor", since the corresponding ellipsoid representation is a hypersphere.

Figure 1B:
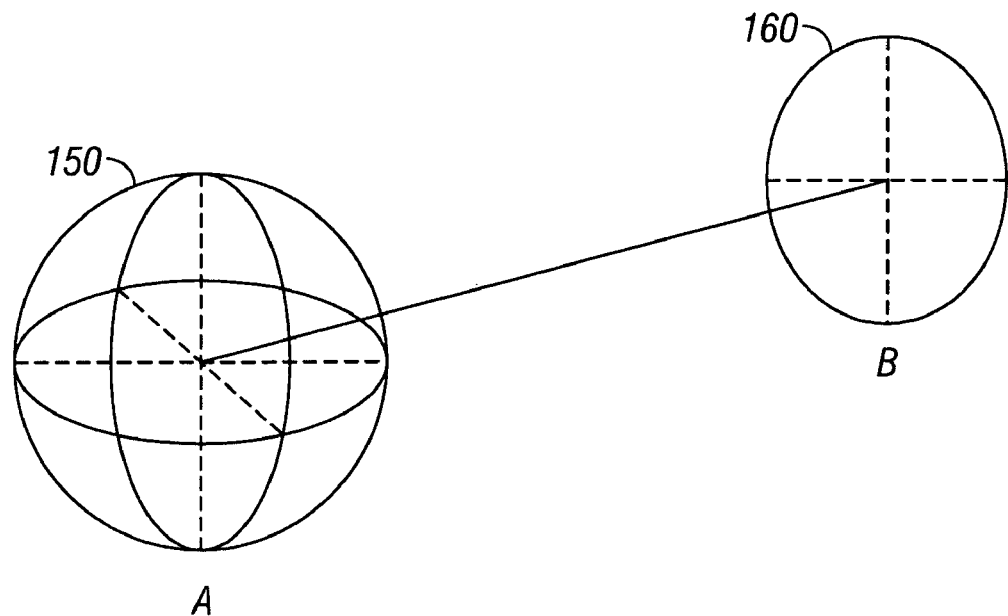

A tensor with only one orientation is called a stick tensor, and is shown in FIG. 1A. Any point on a manifold of known dimensionality and orientation can be encoded as tensors in this way at 300.

Once encoded in this way, any tensor structure can be found by examining its eigensystem.

A tensor with these properties can be decomposed according to the following:

$$T = \sum_{d=1}^{N} \lambda_d \hat{e}_d \hat{e}_d^T = \qquad (2)$$
$$= (\lambda_1 - \lambda_2)\hat{e}_1\hat{e}_1^T + (\lambda_2 - \lambda_3)(\hat{e}_1\hat{e}_1^T + \hat{e}_2\hat{e}_2^T) + \ldots + \lambda_N$$
$$(\hat{e}_1\hat{e}_1^T + \hat{e}_2\hat{e}_2^T + \ldots + \hat{e}_N\hat{e}_N^T)$$
$$= \sum_{d=1}^{N-1} \left[ (\lambda_d - \lambda_{d+1}) \sum_{k=1}^{d} \hat{e}_d \hat{e}_d^T \right] + \lambda_N(\hat{e}_1\hat{e}_1^T + \ldots + \hat{e}_N\hat{e}_N^T)$$

where $\lambda_d$ are the eigenvalues in descending order and $\hat{e}_d$ are the corresponding eigenvectors. The tensor simultaneously encodes all possible types of structure. The confidence in the type that has d normals is encoded in the difference between the eigenvalues $\lambda_d$-$\lambda_{d+1}$. If a hard decision on the dimensionality is required, the point can be assigned as being the type with the maximum confidence.

As described above, the voting process that is used depends greatly on human perception. Accordingly, a tensor voting framework is used that is designed to enforce constraints including proximity, co-linearity, and co-curvilinearity maintaining the idea of human perception in 2 dimensions and 3 dimensions. These constraints hold in higher dimensional spaces based on the assumption that the manifolds are smooth, but requiring no other assumptions.

At 310, vote information is propagated from a point called the voter to another point called the receiver. The relationship between these points defines the manifold surface. The voter casts a vote which is also a second order, symmetric, nonnegative definitive tensor. The receiver receives that vote. The eigenstructure of the vote represents both the normal and tangent spaces that the receiver would have, if the voter and receiver were in the same smooth structure.

The vote can take one of multiple different forms. For simplicity, examination of the vote first considers a stick tensor of unit length as shown in FIG. 1A. The magnitude of a vote associated with a stick tensor 100 decays with respect to the length of a smooth circular path 102 that connects the voter and receiver when there is only a single orientation, and the orientation is known. The path defines a circle, which maintains constant curvature at all orientations.

The circle degenerates to a straight-line if the vector connecting the voter and receiver is orthogonal to the normal of the voter.

The orientation of the vote is towards the center of the circle defined by the two points (voter and receiver) and the orientation of the voter.

The vote is generated, for example, according to equation 3:

$$S(s, l, \theta) = e^{-\left(\frac{s^2 + c\kappa^2}{\sigma^2}\right)} \begin{bmatrix} -\sin(2\theta) \\ \cos(2\theta) \end{bmatrix} [-\sin(2\theta)\cos(2\theta)] \qquad (3)$$

$$s = \frac{\theta\|\vec{v}\|}{\sin(\theta)},$$

$$K = \frac{2\sin(\theta)}{\|\vec{v}\|}$$

S is the length of the arc between the voter and receiver, and K is its curvature (see FIG. 1(a), $\sigma$ is the scale of voting, and c is a constant. No vote is generated if the angle $\theta$ is more than 45°. Also, the field is truncated to if the magnitude of the vote is more than 3% of the magnitude of the voter.

FIG. 1A illustrates the generation for a stick voter and shows the angles of the vote.

For the more generalized N dimensional case, however, where no orientation is known, the voting converts to the "ball voting" scheme of FIG. 1B, where the voter is ball 150, and the receiver is shown as a curved structure 160. FIG. 1B shows, however, that the vote generated by a ball voter propagates the voter's preference for a straight-line that connects it to the receiver B in 320. The straight-line is the simplest and smoothest connection from a point to another point in the absence of other information. Thus, the vote generated by a ball is a tensor that spans the (n-1) dimension space of the line, and has one zero eigenvalue associated with the eigenvector that is parallel to the line. The magnitude of the vote is a function of the distance between the two points since its curvature is zero. Therefore, the ball vote can be constructed by subtracting the direct product of the tangent unit vector in the direction defined by the voter and receiver coordinates vector from a full rank tensor with equal eigenvalues. The resulting tensor is attenuated by the same Gaussian weights according to the distance between the voter and the receiver.

$$S(s, l, \theta) = e^{-\left(\frac{s^2}{\sigma^2}\right)} \left(I - \vec{v}\vec{v}^T\right) \qquad (4)$$

where $\vec{v}$ is a unit vector parallel to the line connecting the voter and the receiver.

To complete the description of vote generation, we need to describe the case of a tensor that has d equal eigenvalues, where d is not equal to 1 or N. (The description applies to these cases too, but we use the above direct computations) Let $\vec{v}$ again be the vector connection between the voting and the receiving points. It can be decomposed into $\vec{v}_t$ in the tangent space of the voter and $\vec{v}_n$ in the normal space. The new vote generation process is based on the observation that curvature in Eq. 3 is not a factor when $\theta$ is zero, or in other words, if the voting stick is orthogonal to $\vec{v}_n$. We can exploit this by defining a new basis for the normal space of the voter that includes $\vec{v}_n$. Then, the vote is constructed as the tensor addition of the votes case by stick tensors parallel to the new basis vectors. Among those votes, only the one generated by the stick tensor parallel to $\vec{v}_n$ is not parallel to the normal space of the voter and has a curvature that needs to be considered. All other votes are a function of the length of $\vec{v}_t$ only. FIG. 4 illustrates this in 3D.

Tensor addition of the stick values is weighted by $\lambda_d$-$\lambda_{d+1}$. The ball component whose curvature needs to be considered, is weighted by $\lambda_D$.

This implementation of tensor voting is more efficient in terms of space, since there is no need to store voting fields that would be $O(Dk^D)$, and in terms of time since we have devised a direct method for computing votes that replaces the numerical integration of the prior art.

Vote analysis is carried out at 320. Each point casts a vote to its neighbors within the distance at which vote magnitude attenuates to approximately 3% of the maximum. The votes are accumulated at each point by tensor addition, for example matrix addition. The eigensystem of the resulting tensor is then computed and decomposed using the description of Equation 2. An estimate of local intrinsic dimensionality is given for the maximum eigenvalues. For example if $\lambda_1$-$\lambda_2$ is the maximum difference between two successive eigenvalues, then the dominant component of the tensor is one that has one normal. More generally, if the eigenvalues spread from $\lambda_d$ to $\lambda_{d+1}$, and the local dimensionality is N-d, then the manifold has d normals, and N-d tangents. Moreover, the first d eigenvectors that correspond to the large eigenvalues are the normals of the manifold, the remaining eigenvectors being tangents.

Votes from randomly distributed voters cancel each other out and accumulate in the ball component of the tensor.

This technique enables representing all potential types simultaneously. For example, it can naturally represent intersections. The intersection of two surfaces in 3-D, for example, is a curve with a tangent and two normals. This spans the union of the normal spaces of the two surfaces, and is easily captured by the tensor addition of votes.

The value σ represents the scale of voting. Small values tend to preserve more details, while larger values are more robust against noise. The scale value can be set according to the desired technique.

Tests have illustrated that this technique may be one or more orders of magnitude more efficient than existing techniques.

The above has described how the tensor voting can be carried out. Different refinements may include preferred ways of including the data and storing the data.

Since the system uses n dimensional data, the inputs must include that n dimensional data in the form of unoriented points defined in terms of their coordinates, e.g. x,y,z coordinates. Alternatively, the inputs may be in the form of oriented tensors provided as sets of coordinates whose eigenvalues and eigenvectors encode the likelihood of the point being in a structure. The input data can be generated by any kind of process that produces point outputs. For example, this may include samples of a function, or measurements or observations of systems with multiple degrees of freedom. The output of the process includes a set of local descriptors that each input position. The descriptors may form second order tensors whose eigenvalues and eigenvectors encode the likelihood of the point being in a structure. The descriptors also encode the intrinsic dimensionality of the structure, as well as its normal and tangent orientations.

In an embodiment, the data is stored in an approximate nearest neighbor tree. The tree may be in the form of a K-D tree which allows the fast retrieval of either the K nearest neighbors or all the nearest neighbors within the distance d of a query point. The query point is not necessarily within the data set. This is accomplished with sublinear complexity on the order of O(N log M) for each point.

The tensor voting scheme discussed above may be used for learning the manifold structures from samples. One application is that of learning the manifold structure from samples of the structure. Exemplary structures to be described may include the "swiss roll", a multi dimensional structure, or points in high dimensions. The working may enable evaluating distances between a point and an interpolation of the manifold shape.

This embodiment teaches how to compute the distance between any two points on a manifold by taking small steps on the manifold, collecting votes, estimating the local tangent space and advancing on that space until the destination is reached.

The processing, shown in FIG. 4, begins at 400 by learning the manifold structure as discussed above, starting from unoriented points that are represented by ball tensors.

At 410, a starting point is selected. This starting point needs to be on the manifold. A target point or a desired direction is also selected, for example a vector from the origin to the target. Each step allows projecting the desired direction on the tangent space of the current point and creating a new point at a small distance.

The original points may have no orientation information, and hence may vote as ball tensors.

Following 410, the tangent space of the new point is computed by collecting votes from the neighboring points as in regular tensor voting. The tensors used in this step at 420 are not balls, but rather are the tensors resulting from the previous voting pass. The desired direction is then projected on the tangent space of the new point until the destination is reached within a value ε. Then, the manifold distance between these two points is approximated by measuring the length of the path.

Manifold distances can be used for various purposes since they are more meaningful as dissimilarity measures for points on nonlinear manifolds. Typical applications include data clustering and classification.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above describes the mathematics in terms of eigenvalues and eigenvectors, it should be understood that any vector and/or scalar values could be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method performed by an apparatus, the method comprising:
   receiving as input a plurality of points in an N-dimensional space, where N can be any number between 2 and 500;
   defining the received plurality of points as second order, symmetric, nonnegative definite tensors that encode an orientation and confidence of the orientation of each point, the tensors comprising a voter having multiple possible orientations;
   voting between points to determine, in an unsupervised manner, at least one likely D-dimensional manifold on which said points lie, where D is less than or equal to N, wherein said voting comprises voting between the voter and a receiver by directly computing, without a voting field, a vote between the voter and the receiver; and
   producing and outputting information about said at least one D-dimensional manifold used to find relations between points based on the voting between the voter and the receiver.

2. A method as in claim 1, wherein at least some points have preferred normal and tangent orientation information and other points do not have preferred normal and tangent orientation information.

3. A method as in claim 1, wherein said input points include oriented points.

4. A method as in claim 1, wherein said input points include unoriented points.

5. A method as in claim 1, further comprising learning unknown manifolds from sets of points in terms of estimates of local tangent and normal spaces.

6. A method as in claim 5, wherein said voting comprises reducing the effect of points which are not part of the at least one manifold.

7. A method as in claim 5, wherein said learning unknown manifolds comprises learning a plurality of manifolds, which can intersect and are of different types.

8. A method as in claim 5, further comprising estimating an intrinsic dimensionality of the at least one D dimensional manifold passing through the points.

9. A method as in claim 8, whereby different points have different intrinsic dimensionalities.

10. A method as in claim 1, wherein voting between points comprises estimating an arc between a voter point and a receiver point having an arc length, S, calculated based on the following:

$$S(s, l, \theta) = e^{-\left(\frac{s^2+cK^2}{\sigma^2}\right)} \begin{bmatrix} -\sin(2\theta) \\ \cos(2\theta) \end{bmatrix} [-\sin(2\theta)\cos(2\theta)]$$

$$s = \frac{\theta\|\vec{v}\|}{\sin(\theta)},$$

$$K = \frac{2\sin(\theta)}{\|\vec{v}\|},$$

wherein K represents a curvature of the arc, $\sigma$ represents a scale of voting, c is a constant, $\theta$ represents an angle of the arc, and $\vec{v}$ represents a vector connection between the voter point and the receiver point.

11. The method of claim 1, wherein the voter comprises a ball tensor and wherein the voting between the voter and the receiver by directly computing, without a voting field, the vote between the voter and the receiver comprises voting according to:

$$S(s,l,\theta) = e^{-(s^2/\sigma^2)}(I - \vec{v}\vec{v}^T)$$

wherein $\vec{v}$ is a unit vector parallel to a line connecting the voter and the receiver, I is an identity matrix, and s is a length between the voter and the receiver, an $\sigma$ is a user-defined scale of voting.

* * * * *